(12) United States Patent
Yuan et al.

(10) Patent No.: US 6,310,893 B1
(45) Date of Patent: Oct. 30, 2001

(54) METHOD AND SYSTEM FOR CONNECTIONLESS COMMUNICATION IN A CELL RELAY SATELLITE NETWORK

(75) Inventors: Ruixi Yuan, Waltham; Bora Akyol, Chelmsford; William Timothy Strayer, West Newton, all of MA (US)

(73) Assignees: Genuity Inc., Burlington, MA (US); GTE Service Corporation, Irving, TX (US)

( * ) Notice: Subject to any disclaimer, the term of this patent is extended or adjusted under 35 U.S.C. 154(b) by 0 days.

(21) Appl. No.: 09/098,622

(22) Filed: Jun. 17, 1998

(51) Int. Cl.$^7$ ................................................. H04J 3/24
(52) U.S. Cl. ...................... 370/474; 370/389; 370/316; 370/476; 455/428
(58) Field of Search ................................. 370/315, 316, 370/389, 392, 400, 474, 476; 455/422, 427, 428, 431

(56) References Cited

U.S. PATENT DOCUMENTS

| | | | |
|---|---|---|---|
| 5,065,398 | * 11/1991 | Takashima | 370/230 |
| 5,396,643 | * 3/1995 | Frenzer et al. | 455/13.1 |
| 5,432,777 | 7/1995 | Le Boudec et al. . | |
| 5,517,497 | 5/1996 | Le Boudec et al. . | |
| 5,563,879 | * 10/1996 | Sanders et al. | 370/474 |
| 5,600,629 | * 2/1997 | Van Daele et al. | 370/349 |
| 5,852,721 | * 12/1998 | Dillon et al. | 395/200.47 |
| 5,909,439 | * 6/1999 | Kuwabara et al. | 370/398 |

OTHER PUBLICATIONS

M. Laubach, Classical IP and ARP over ATM, Internet RFC 1577, Jan. 1994.
The ATM Forum Technical Committee, LAN Emulation Over ATM Version 1.0, af–lane–0021.000, Jan. 1995.
The ATM Forum Technical Committee, Multi–Protocol Over ATM Version 1.0, AF–MPOA–0087.000, Jul. 1997.

* cited by examiner

*Primary Examiner*—Ajit Patel
*Assistant Examiner*—Bob A. Phunkulh
(74) *Attorney, Agent, or Firm*—James K. Weixel

(57) ABSTRACT

A method and system for communicating a packet over a cell relay satellite network, without establishing a connection in the cell relay satellite network, comprises the steps of segmenting the packet into a number of segments at a source node in the communications network, generating for each of the segments a fixed size cell that includes a cell header and a payload with a prefix, a downlink beam locator, and a source node identifier included in the cell header, and inserting each segment into the payload of each generated cell, respectively, and transmitting the cells to the cell relay satellite. A cell relay satellite receives each transmitted cell from the source node, and broadcasts each cell on a downlink beam corresponding to the downlink beam locator in each cell header. A destination node receives each broadcasted cell on the downlink beam, and re-assembles the packet from the received cells. Specifically, the destination node re-assembles the packet by identifying the cells corresponding to the packet, and appending the segments inside the cell payloads together, in the order of receipt of the identified cells. Finally, the destination node may identify a destination address in the packet, and may route the packet to the identified destination address, which may reside in another communications network.

1 Claim, 7 Drawing Sheets

US 6,310,893 B1

METHOD AND SYSTEM FOR CONNECTIONLESS COMMUNICATION IN A CELL RELAY SATELLITE NETWORK

BACKGROUND OF THE INVENTION

FIELD OF THE INVENTION

The present invention generally relates to cell relay satellite communication networks, and more particularly, to connectionless cell relay satellite networks.

BACKGROUND OF THE ART

With the deployment of connection-oriented cell relay networks such as Asynchronous Transfer Mode (ATM) networks, there is a growing need for integrating cell relay networks with the existing packet-based networks, for example, Internet Protocol (IP) networks. In a connection-oriented network, the network must establish a connection (called a virtual circuit) between two nodes in the network with a signaling protocol before any information transfer can take place between the two nodes. Once the network establishes the connection between the two nodes, the network can identify and route the cells transmitted by the two nodes through the network. As a result, the existing cell relay networks must establish a connection between a source node and a destination node in the cell relay networks in order to transport IP traffic over the cell relay networks.

In general, satellite-based cell relay networks offer certain advantages over terrestrial cell relay networks. For example, a satellite-based cell relay network can provide rapid deployment of communication services over a wide geographical area, including remote, rural, urban, and inaccessible areas. Furthermore, satellite-based cell relay networks offer more flexibility in configuring a network and allocating capacity to different sites. Thus, there is a need for a cell relay satellite network that can support the traffic from the existing packet-based communication networks.

Connection-oriented cell relay satellite networks, however, have two significant disadvantages when transporting packet-based traffic from the existing networks. First, the connection-oriented cell relay satellite network must establish a connection between a source node and a destination node before any information transfer can take place between the source node and the destination node, and as a result, the information transfer will experience an initial delay due to the connection setup phase. Second, the satellite network must assign a unique identifier to each connection and manage the assignment of the identifiers so that the network an efficiently reuse each identifier when establishing a new connection.

Each of these two disadvantages are particularly magnified in a cell relay satellite network. A satellite footprint typically covers a wide geographical area, which may include large number of users, and thus, requires a large number of corresponding connection identifiers to support the users. Furthermore, each communication with, for example, a geosynchronous satellite typically experiences a 500 milliseconds round trip delay, which increases the delay due to the connection setup phase.

Thus, it is desirable to have a method and system for communicating packet-based traffic over a cell relay satellite network without establishing a connection in the cell relay satellite network, and thus, eliminating the above-mentioned disadvantages.

SUMMARY OF THE INVENTION

The present invention comprises a method and system for communicating a packet over a cell relay satellite network, without establishing a connection in the cell relay satellite network, by dividing the packet into a number of segments at a source node in the communications network, generating for each segment a fixed size cell that includes a cell header and a payload, with a prefix, a downlink beam locator, and a source node identifier inside each cell header, inserting each of the segments into the payload of each of the generated cells, respectively, and transmitting the cells to the cell relay satellite. The cell relay satellite receives each transmitted cell from the source node, and broadcasts each cell on a downlink beam corresponding to the downlink beam locator in each cell header.

A destination node in the cell relay satellite network receives each broadcasted cell on the downlink beam, and re-assembles the packet from the segments inside the payloads of the received cells. Specifically, the destination node re-assembles the packet by identifying the cells corresponding to the packet, and appending the segments inside the payloads of the identified cells together in the order of receipt of the identified cells. Finally, the destination node may identify a destination address in the packet, and may route the packet to the identified destination address, which may reside in another communications network.

Methods and systems consistent with the present invention have two notable advantages over the existing cell relay satellite networks: First, a cell relay satellite network consistent with the present invention does not need to establish a connection in the network, and thus, eliminating the initial connection setup delay in the existing cell relay networks. Second, a cell relay satellite network consistent with the present invention does not need to expend valuable network processing resources for managing the assignment of unique identifiers to connections in the network.

This summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

DETAILED DESCRIPTION

The following description refers to the accompanying drawings. Where appropriate, the same reference numbers in different drawings refer to the same or similar elements.

Methods and systems consistent with the present invention communicate a packet over a cell relay satellite network, without establishing a connection in the cell relay satellite network, by dividing the packet into one or more segments at a source node in the cell relay satellite network. For each segment, the source node generates a fixed size cell that includes a cell header and a payload. The source node includes in each cell header a prefix, a downlink beam locator, and a source node identifier, and inserts the segments into the payloads of the generated cells respectively. The source node then transmits the cells on an uplink beam to the cell relay satellite.

The cell relay satellite receives each transmitted cell on the uplink beam from the source node. The cell relay satellite reads the downlink identifier in each cell header, and identifies a downlink beam corresponding to the downlink beam locator. The cell relay satellite then broadcasts each cell on the identified downlink beam to a destination node within the footprint of the beam in the cell relay satellite network.

The destination node receives each broadcasted cell on the downlink beam, and reassembles the packet from the received cells. Specifically, the destination node identifies the cells corresponding to the packet, and appends the identified segments inside the payloads of the identified cells together in the order of receipt of the identified cells. Finally, the destination node may identify a destination address in the packet, and may route the packet to the identified destination address, which may reside in another communications network.

Figure 1:
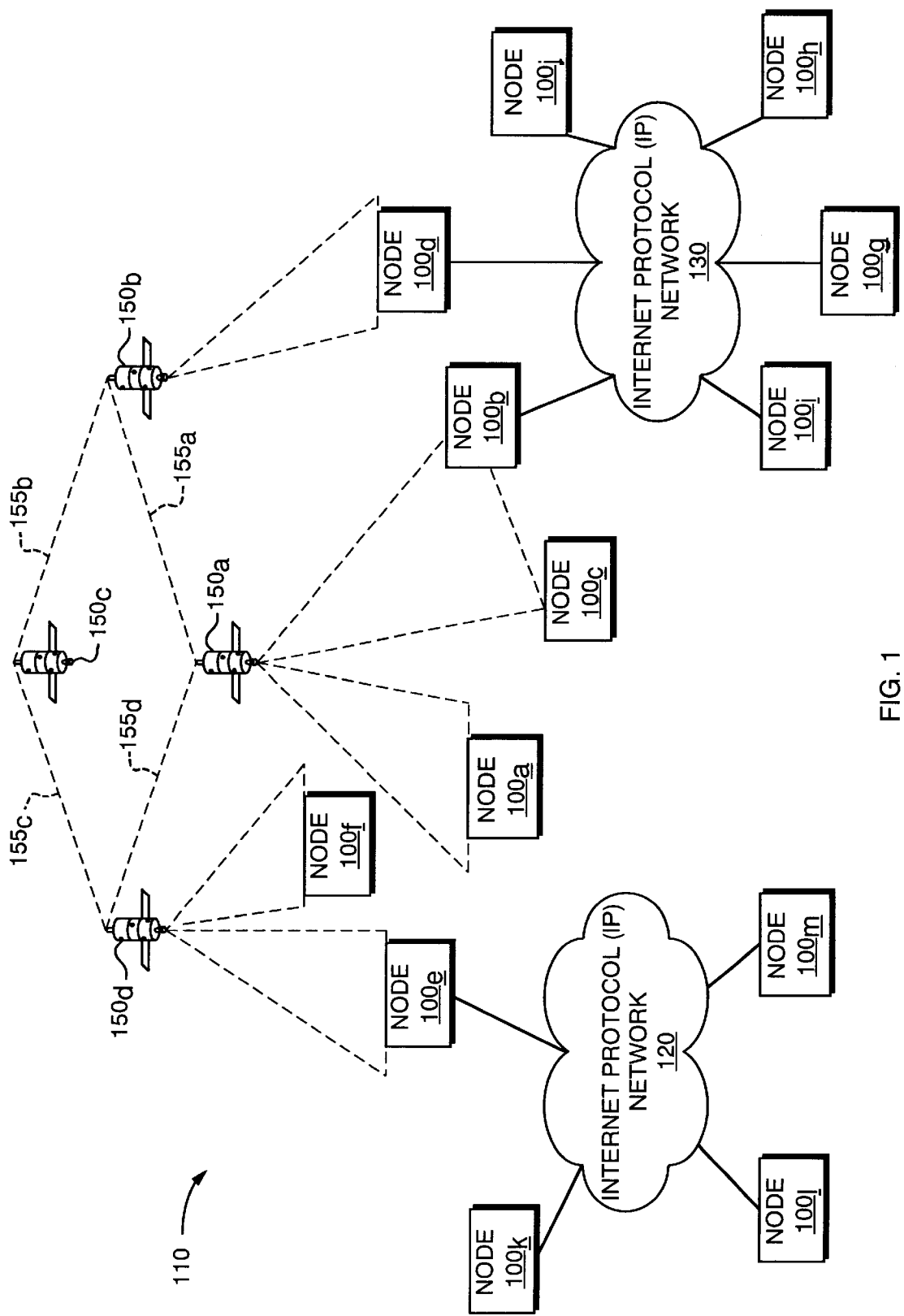
FIG. 1 illustrates a cell relay satellite network in which systems and methods consistent with the invention may be implemented.

FIG. 1 illustrates a cell relay satellite network 110 in which systems and methods consistent with the invention may be implemented. Cell relay satellite network 110 comprises cell relay satellites 150a through 150d, and satellite node terminals 100a through 100f. Cell relay satellite 150a communicates with cell relay satellites 150b and 150d via beams 155a and 155d, respectively. Cell relay satellite 150b communicates with cell relay satellite 150c via beam 155b, and cell relay satellite 150c communicates with cell relay satellite 150d via beam 155c.

Nodes 100a through 100f may include earth station terminals, for example, very small aperture terminals (VSAT), which communicate with each other through cell relay satellites 150a through 150d. Specifically, nodes 100a through 100c are in the beam footprints of cell relay satellite 150a, node 100d is in the beam footprint of cell relay satellite 150b, and nodes 100e and 100f are in the beam footprint of satellite 150d. Nodes 100a through 100f communicate with their respective cell relay satellites 150a through 150d via uplink and downlink beams.

Nodes 100a and 100e interface with a packet-based communications network, for example, Internet Protocol (IP) network 120, and nodes 100b and 100d interface with a different packet-based communications network, for example, IP network 130. Nodes 100g through 100j, which are not in the beam footprint of cell relay satellites 150a through 150d, also interface with IP network 130. Similarly, nodes 100k through 100m, which are not in the beam footprint of cell relay satellites 150a through 150d, interface with IP network 120. Nodes 100g through 100m may include, for example, desktop computers, servers, telephone sets, facsimile machines, and video apparatus.

Nodes 100g through 100j may communicate with nodes 100k through 100m via satellite cell relay network 110. For example, node 100k may generate information, for example, voice, data, and/or video, in form of packets, which node 100k transmits through IP network 120 to a node that interfaces IP network 120, for example, node 100a. Node 100a then segments the packets into one or more segments, insert each segment into payload of a cell, and transmits the cells through cell relay satellite 150a to node 100b. Node 100b then reassembles the packets from the cells and routes the assembled packets through IP network 130 to a destination node, for example, node 100j, whose address is specified in the packets.

Figure 2:
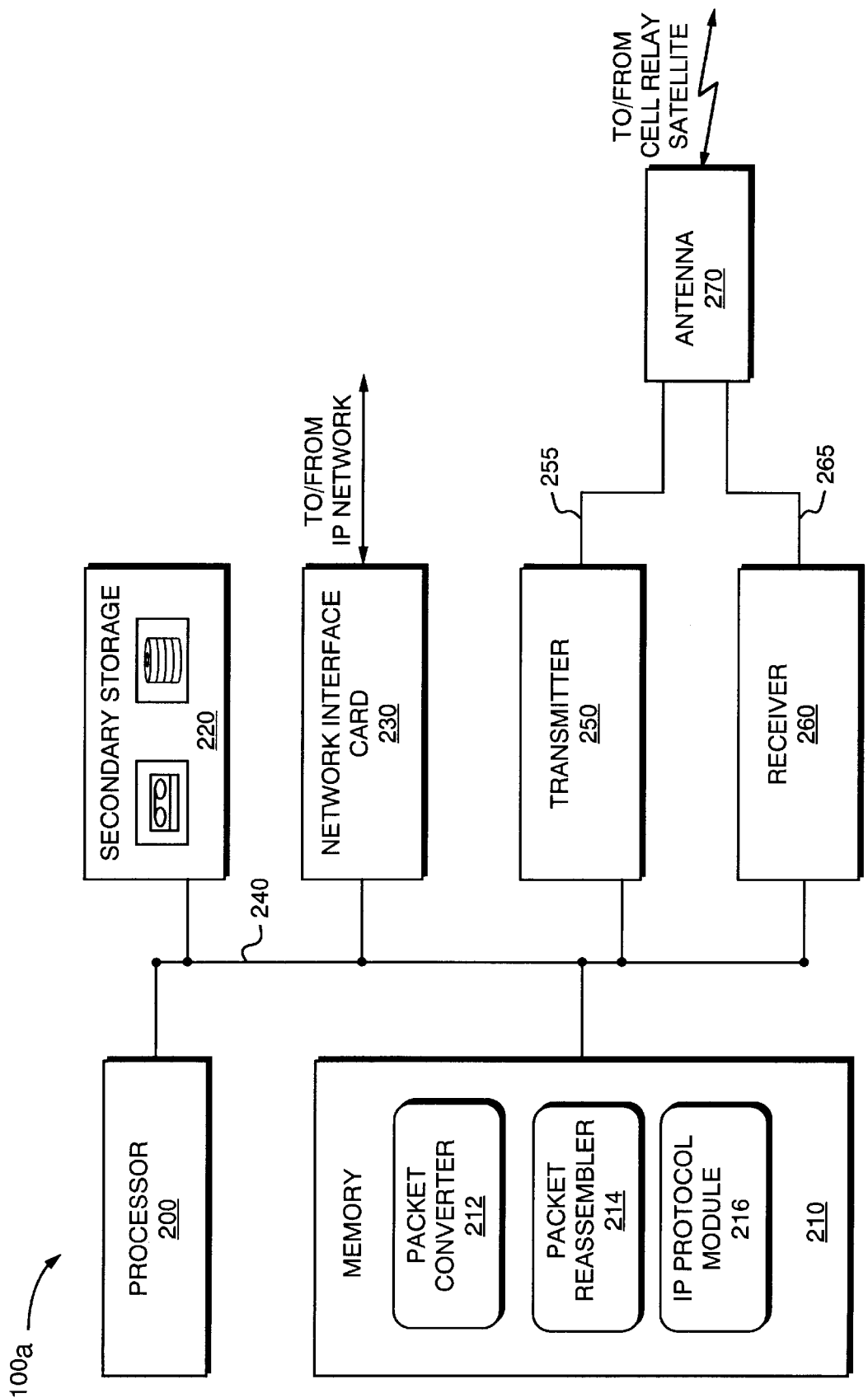
FIG. 2 illustrates a block diagram of a node in a cell relay satellite network in which systems and methods consistent with the invention may be implemented.

FIG. 2 illustrates a block diagram of a node, for example, node 100a, in cell relay satellite network 110. Node 100a comprises a processor 200, a memory 210, a secondary storage 220, a network interface card 230, a transmitter 250, a receiver 260, an antenna 270, and links 255 and 265, all of which are connected together via a bus 240.

Memory 210 includes Packet Converter 212, Packet Reassembler 214, and IP Protocol Module 216, all of which include data and/or instructions that processor 200 executes. Packet Converter 212 generally segments a packet into one or more segments and inserts each segment into a cell. Packet Reassembler 214 generally reassembles a packet from one or more cells, each including a segment of the packet. IP Protocol Module 216 generally includes Internet Protocol (IP), for example, IP version 4, for communicating packets through IP network 120. Specifically, IP Protocol Module 216 drives Network interface card (NIC) 230 for transmitting and receiving packets through IP network 120. NIC 230 may include hardware and/or firmware for transmitting and receiving packets from IP network 120.

Secondary storage 220 comprises computer readable medium such as a disk drive and a tape drive. From the tape drive, software and data may be loaded onto the disk drive, which can then be copied into memory 210. Similarly, software and data in memory 210 may be copied onto the disk drive, which can then be loaded onto the tape drive.

Transmitter 250 connects to antenna 270 via link 255. Transmitter 250 may include a codec and a frequency up converter for transmitting cells via antenna 270 to cell relay satellite 150a. Receiver 260 connects to antenna 270 via link 265. Receiver 260 may include a codec and a frequency down converter for receiving cells via antenna 270 from cell relay satellite 150a.

Figure 3:
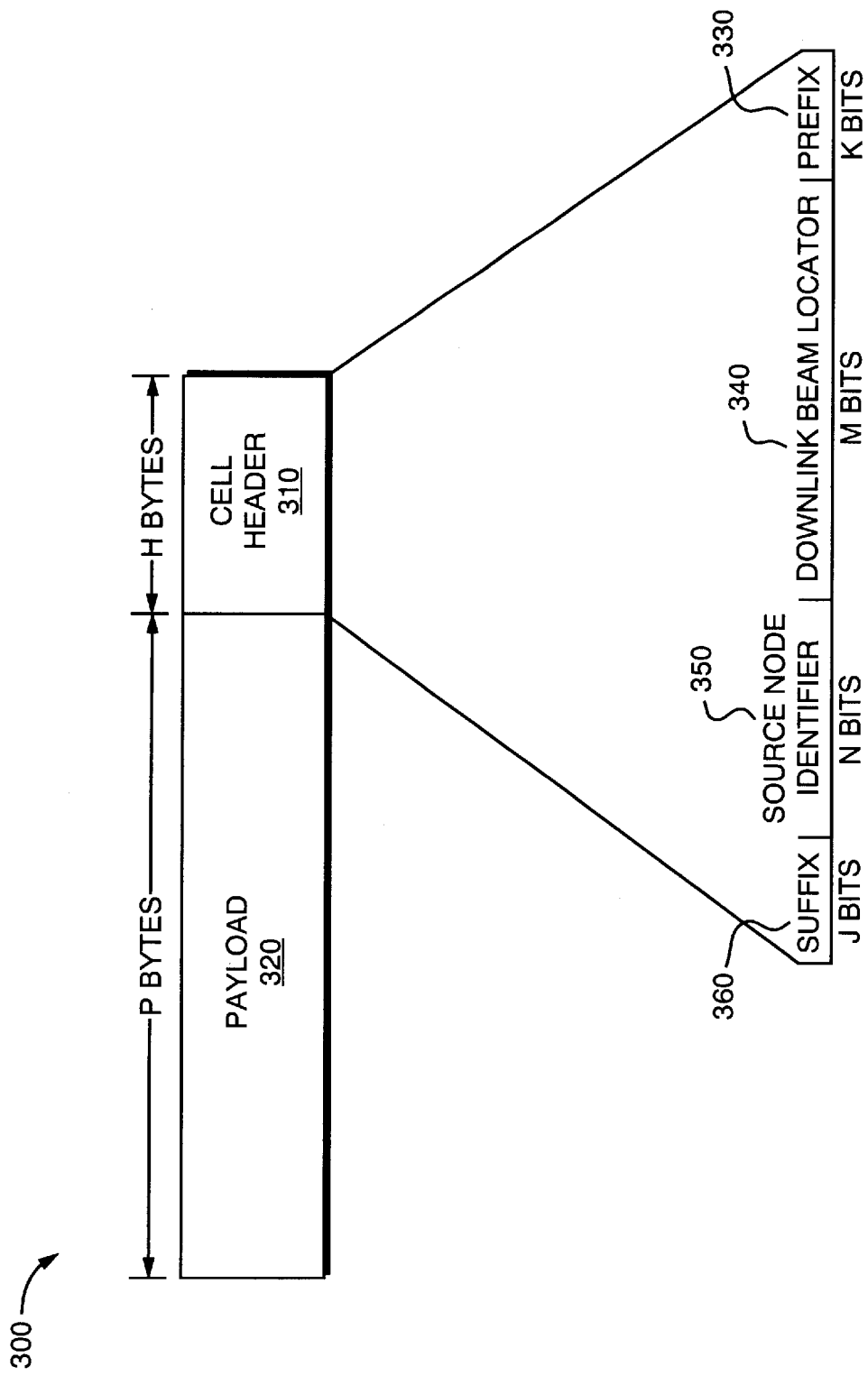
FIG. 3 illustrates a block diagram of a cell in a cell relay satellite network when using systems and methods consistent with the invention.

FIG. 3 is a block diagram of a cell for use in cell relay satellite network 110 in accordance with an implementation of the invention. As shown, cell 300 includes a cell header 310 portion and a payload 320 portion. Cell header 310 has a length of H bytes, and payload 320 has a length of P bytes. Cell 300 may be of any fixed length, for example, 53 bytes, where cell header 310 may have a length of, for example, 5 bytes and payload 320 may have a length of, for example, 48 bytes. Alternatively, cell 300 may be of any other fixed length, with any combination of cell header 310 length and payload 320 length, as a particular length for each is not essential to the practice of the present invention.

Specifically, cell header 310 includes prefix 330, downlink beam locator 340, source node identifier 350, and suffix 360. Prefix 330 has a fixed length of K bits; downlink beam locator 340 has a fixed length of M bits; node identifier 350 has a fixed length of N bits; and suffix 360 has a fixed length of J bits. In one example, prefix 330 may have a length of 6 bits; downlink beam locator 340 may have a length of 9 bits; node identifier 350 may have a length of 20 bits; and suffix 360 may have a length of 5 bits. Alternatively, prefix 330, downlink beam locator 340, node identifier 350, and suffix 360 may be of any combination of lengths, as a particular length for each is not essential to the practice of the present invention.

The first 2 bits of prefix 330 may identify the particular protocol, for example, IP version 4, for handling a re-assembled packet. The next 3 bits of prefix 330 may identify the handling instructions within the particular protocol, for example, the relative priority level within IP version 4. The last bit of prefix 330 may, identify the type of payload 320 in cell 300, for example, whether payload 320 includes the last segment of the packet or other segments of the packet. For example, if payload 320 includes the last segment of the packet, the last bit of prefix 330 is set to "1." Otherwise, the last bit of prefix 330 is set to "0."

Downlink beam locator 340 may identify a particular downlink beam in a cell relay satellite, for example, cell relay satellite 150a, on which cell 300 may be transmitted to a destination node. Alternatively, the first 2 bits of downlink beam locator 340 may identify cell relay satellite 150a, and the remaining bits in downlink beam locator 340 may identify a particular downlink beam in cell relay satellite 150a on which cell 300 may be transmitted. Alternatively, downlink beam locator 340 may include a key or pointer, which cell relay satellite 150a must translate in order to identify the corresponding downlink beam.

Node identifier 350 may identify a source node, for example, node 100a that initiated transmission of cell 300. Suffix 360 may include a cell header error check (HEC) for error checking cell header 310.

Figure 4:
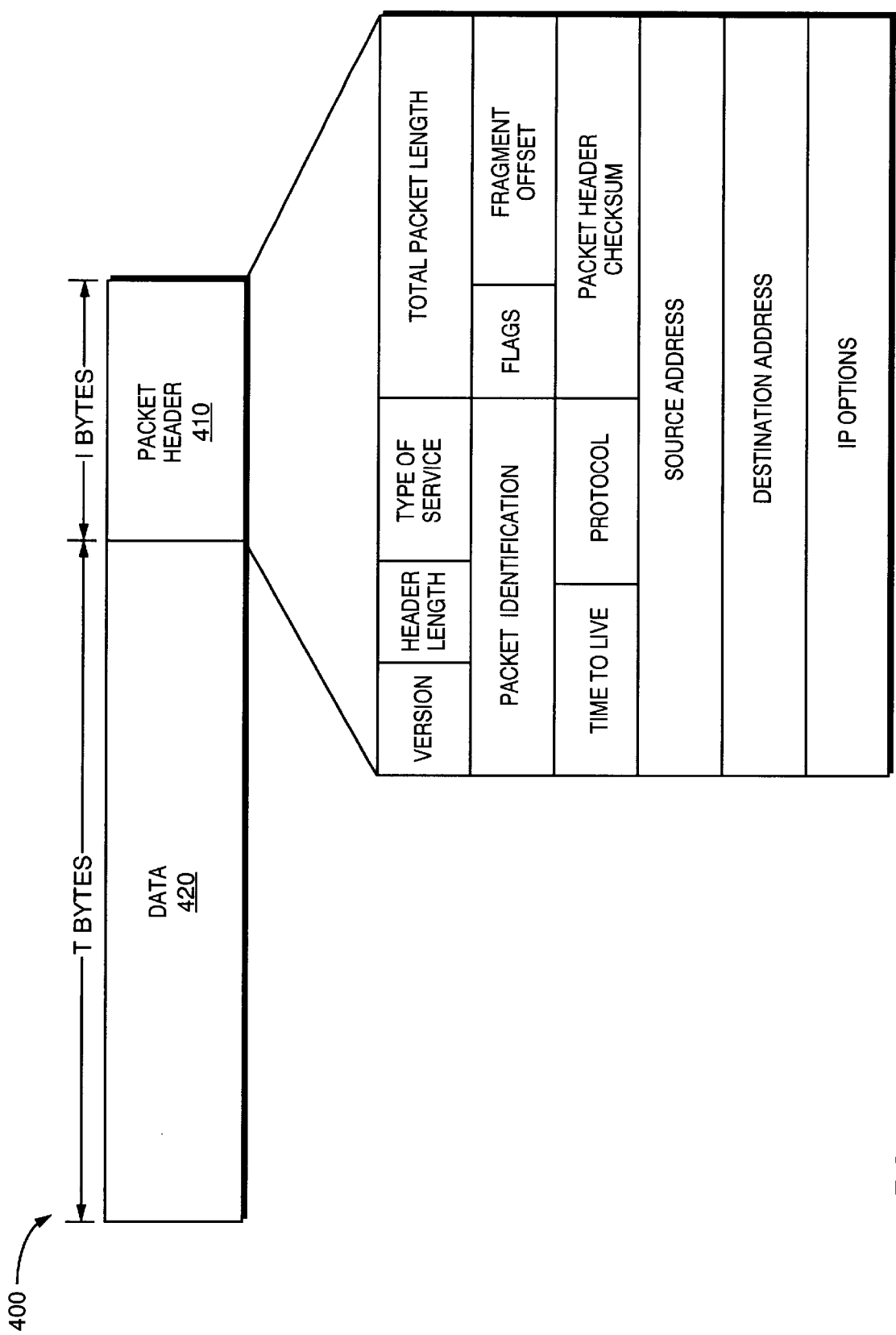
FIG. 4 illustrates a block diagram of a packet, which a node in a cell relay satellite network may communicate through the cell relay satellite network when using systems and methods consistent with the invention.

FIG. 4 illustrates a block diagram of packet 400, which node 100a in cell relay satellite network 110 communicates in accordance with an implementation of the invention. Packet 400 includes a packet header 410 portion and data 420 portion. Packet header 410 may have a variable length of I bytes. Data 420 may have a variable length of T bytes. As shown, packet header 410 may include, for example, a version, header length, type of service, total packet length, packet identification, flags, fragment offset, time to live, protocol identifier, packet header checksum, source node address, destination node address, and other IP protocol options. Alternatively, packet header 410 may include any other combination of fields, as the particular format and types of information in packet header 410 are not essential to the practice of the present invention.

A node in cell relay satellite network 110, for example node 100a, may receive from another node, for example node, 100k, packet 400 with packet header 410 specifying destination node address of, for example, node 100g, which interfaces IP network 130. Specifically, NIC 230 receives packet 400 from IP network 120, and stores packet 400 in memory 210 via bus 240. NIC 230 then generates an interrupt signal in processor 200, and provides the address of packet 400 stored in memory 210 to Packet Converter 212.

Figure 6:
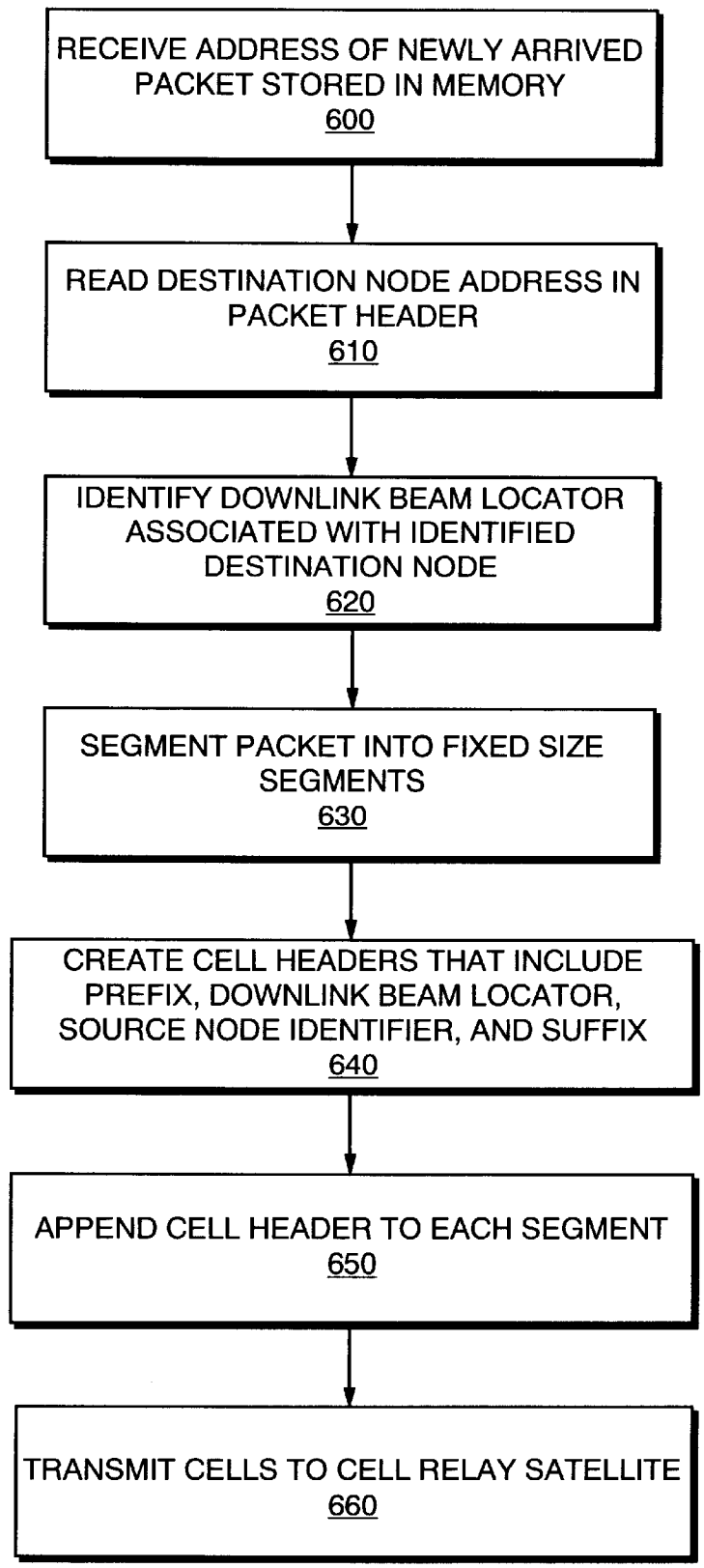
FIG. 6 illustrates a flow chart of the steps that a node performs to segment a packet into one or more cells for transmission in a cell relay satellite network when using systems and methods consistent with the invention.

FIG. 6 illustrates a flow chart of the steps that Packet Converter 212 in node $100_a$ performs to segment packet 400 into one or more cells for transmission in cell relay satellite network 110 in accordance with an implementation of the invention. Packet Converter 212 receives from NIC 230 the memory address of packet 400 in memory 210 (step 600). Packet Converter 212 reads the destination node address in packet header 410 (step 610). Node 100a then identifies a downlink beam in cell relay satellite network 110 for routing packet 400 to node 100g (step 620). Specifically, Packet Converter 212 identifies the downlink beam locator by referencing, for example, a stored routing table whose entry maps a destination node address, for example, node 100g, to a particular downlink beam locator in cell relay satellite network 110. The stored routing table may be generated by, for example, IP Protocol Module 216.

Figure 5:
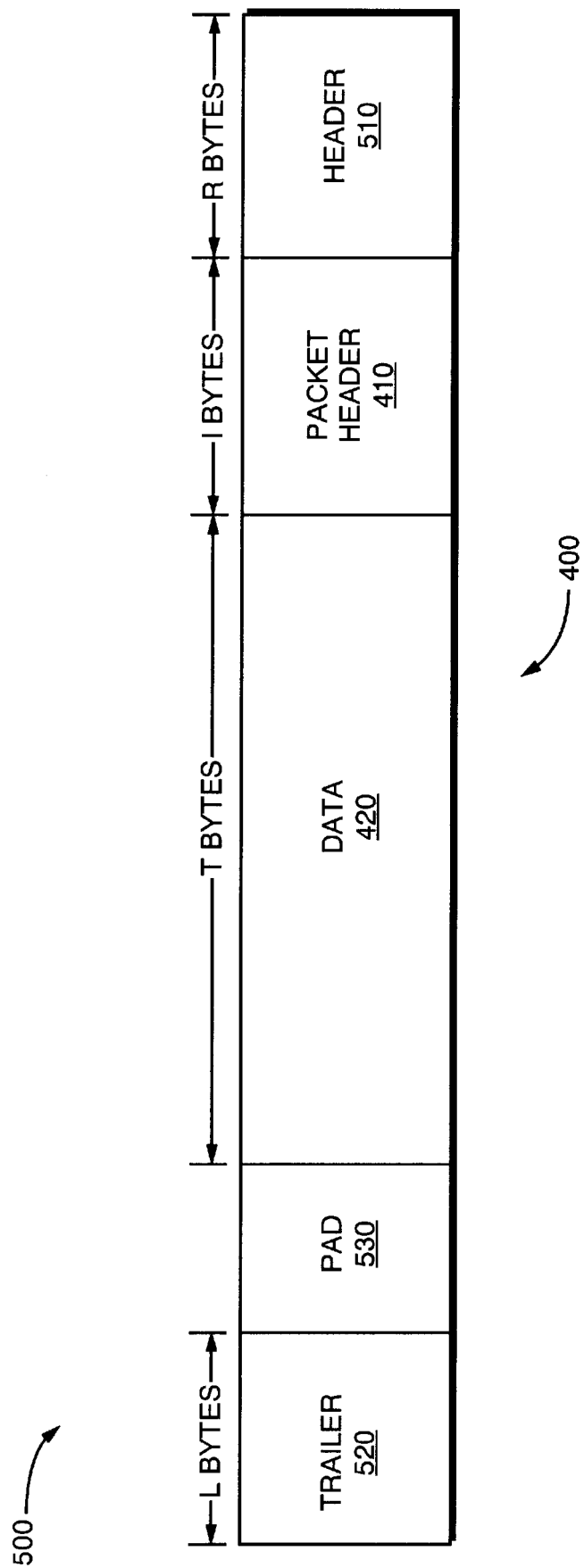
FIG. 5 illustrates a block diagram of a packet, which a node in a cell relay satellite network may communicate through the cell relay satellite network when using systems and methods consistent with the invention.

Packet Converter 212 then segments packet 400 into fixed size segments of, for example, 48 bytes (step 630). Alternatively, as shown in FIG. 5, Packet Converter 212 may prepend header 510 portion, and append null padding 530 portion and trailer 520 portion to packet before segmenting packet 400. Header 510 may have a length of R bytes. Trailer 520 may have a length of L bytes. Furthermore, Packet Converter 212 may determine the length of null padding 530 to be such that the combined length of packet 400, header 530, trailer 420, and null padding 530 becomes a multiple integer of the length of payload 320 in cell 300. This combined length may be determined as follows:

combined length=P * {smallest integer greater than or equal to [(T+I+R+L)/P]}, where, as described above, P is length of payload 320, I is length of packet header 410, and T is length of data 420 portion of packet 400. From the computed combined length, the null padding 530 length may be determined as follows:

null padding length=combined length−T−I−R−L.

In this alternative configuration, packet 400 may have a length of, for example, 500 bytes, and cell payload 320 may have a length of, for example, 48 bytes. Header 510 may have a length of 8 bytes, and may include, for example, the identifier "0xAA-AA-03-00-00-00-08-00," disclosed in "Multiple-Protocol Encapsulation Over AAL5," Internet Engineering Task Force, RFC1483. Trailer 520 may also have a length of 8 bytes, whose first 2 bytes represent the length of packet 400, the second 4 bytes include a cyclical redundancy code (CRC) for error checking, and the last 2 bytes are null. Thus, Packet Converter 212 determines the combined length and length of null padding 530 as follows:

combined length=528 bytes=48 bytes * {smallest integer>=(500 bytes+8 bytes+8 bytes)/48 bytes}, length of null padding=12 bytes=(528 bytes−500 bytes−8 bytes−8 bytes).

Finally, after prepending header 510, and appending null padding 530 and trailer 520 to packet 400, Packet Converter 212, segments the appended and prepended packet 500 into fixed size segments of 48 bytes.

Packet Converter 212 then creates cell header 310 for each packet segment (step 640), and prepends cell header 310 to each packet segment (step 650). Specifically, in the cell header 310 prepended to the each segment, Packet Converter 212 sets the first 2 bits of prefix 330 to identify the particular protocol, for example, IP version 4, for handling the reassembled packet. Packet Converter 212 then sets the next 3 bits of prefix 330 to identify the relative priority level within IP version 4. Finally, Packet Converter 212 sets the last bit of prefix 330 to identify the type of payload 320 in cell 300, for example, whether payload 320 includes the last segment of packet 400 or other segments of the packet. If cell header 310 is prepended to the last segment of packet 400, Packet Converter 212 sets the last bit of prefix 330 to "1." Otherwise, Packet Converter 212 sets the last bit of prefix 330 to "0."

Packet Converter 212 sets downlink beam locator 340 in each cell header 310 to the downlink beam identifier that Packet Converter 212 identified in step 620. Furthermore, Packet Converter 212 sets node identifier 350 in each cell header 310 to the address of node 100a. Packet Converter 212 calculates a header error check (HEC) and includes the HEC in suffix 360 of each cell header 310. Finally, Packet Converter 212 generates an interrupt signal in processor 200, and provides the address of each completed cell in memory 210 to transmitter 250. Transmitter 250 then transmits each cell in order starting with the cell that includes the first packet segment and ending with the cell that includes the last packet segment through antenna 270 and via an uplink beam to cell relay satellite 150a.

Cell relay satellite 150a receives each cell 300 at an input port, which receives the uplink beam. Cell relay satellite 150a then reads downlink beam locator 340 in each cell header 310, and identifies an output port corresponding to downlink beam locator 340 by, for example, translating downlink beam locator 340 into a unique downlink beam identifier. Cell relay satellite 150a then relays each cell 300 in order of arrival to the identified output port, which in turn transmits each cell 300 on a downlink beam corresponding to downlink beam locator 340.

Each node, for example, node 100b and node 100c in the footprint of the downlink beam of cell relay satellite 150a receives each cell 300. Specifically, receiver 260 in node 100b receives each cell 300 via antenna 270, and stores each cell in memory 210 of node 100b. Receiver 260 then generates an interrupt signal in processor 200, and provides Packet Reassembler 214 the address of each cell 300 in memory 210, as each cell 300 arrives at node 100b.

Figure 7:
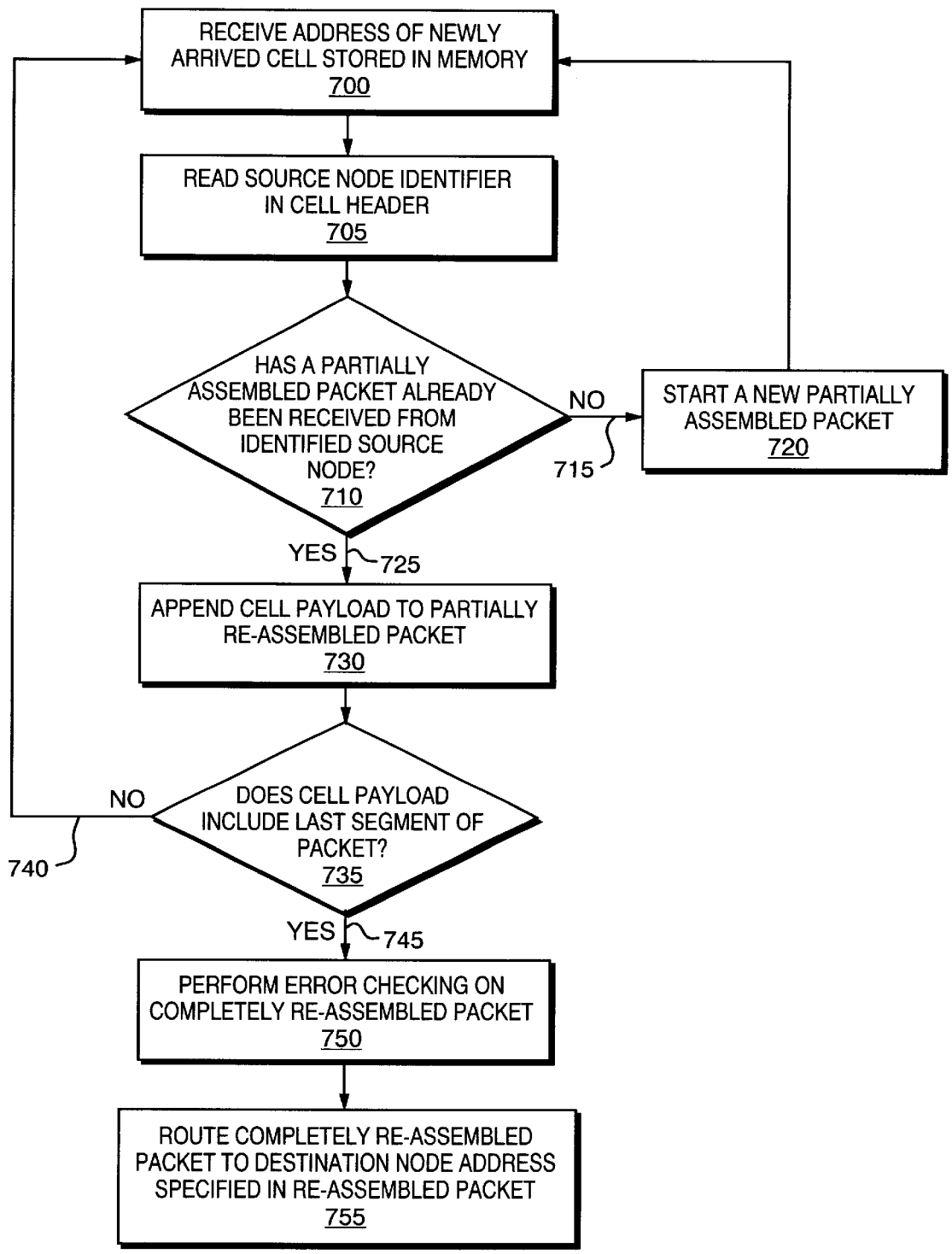
FIG. 7 illustrates a flow chart of the steps that a destination node performs to reassemble a packet from one or more cells in a cell relay satellite network when using systems and methods consistent with the invention.

FIG. 7 illustrates a flow chart of the steps that Packet Reassembler 214 in node 100b, performs to re-assemble packet 400 from one or more cells received by node 100b in accordance with an implementation of the invention. Packet Reassembler 214 receives from receiver 260 address of cell 300 in memory 210 (step 700). From node identifier 350 in cell header 310, Packet Reassembler 214 identifies the address of the node that transmitted cell 300, for example, node 100a (step 705). Packet Reassembler 214 then determines whether a partially assembled packet from node 100a already exists in memory 210 (step 710).

If Packet Reassembler 214 determines that a partially assembled packet from node 100a does not exist in memory 210 (step 715), Packet Reassembler 214 starts a new partially assembled packet in memory 210 (step 720). Specifically, Packet Reassembler 214 strips cell header 310 from cell payload 320, which includes a segment of packet 400, and stores the segment in memory 210. Packet Reassembler 214 then waits to receive the address of the next newly arriving cell in memory 210 (step 700).

If Packet Reassembler 214 determines that a partially assembled packet from node 100a already exists in memory 210 (step 725), Packet Reassembler 214 strips cell header 310 from cell payload 320 and prepends the segment of packet 400 in cell payload 320 to the partially assembled packet stored in memory 210 (step 730).

Packet Reassembler 214 then determines whether cell payload 320 includes the last segment of packet 400 (step 735). Specifically, Packet Reassembler 214 may read, for example, the last bit of prefix 330 in cell header 310 to make this determination. If the last bit of prefix 330 is "0", then Packet Reassembler 214 determines that cell payload 320 does not include the last segment of packet 400 (step 740). Packet Reassembler 214 then waits to receive the address of the next newly arriving cell in memory 210 (step 700). If the last bit of prefix 330 is "1," then Packet Reassembler 214 determines that cell payload 320 includes the last segment of packet 400 and that packet 400 has been re-assembled in memory 210 (step 745).

Packet Reassembler 214 then performs error checking on the re-assembled packet 400 (step 750). For example, Packet Reassembler 214 may use packet header checksum field in packet header 410 to perform the error checking step. In the implementation shown in FIG. 5, Packet Reassembler 214 may use the 4 bytes CRC field in trailer 520 to perform error checking on the appended and prepended packet 500. In this implementation, upon successful completion of the error checking step, Packet Reassembler 214 strips header 510, trailer 520, and null padding 530, if any, from the appended and prepended packet 500 to successfully re-assemble packet 400.

Once node 100b re-assembles packet 400, node 100b may identify in packet header 410 the destination node address of packet 400, for example IP address of node 100g, and may route packet 400 through IP network 130 to node 100g (step 755). Node 100c performs the same steps as node 100b to receive each cell 300 and to re-assemble packet 400. However, when node 100c identifies in packet header 410 the destination node address of packet 400, node 100c determines that it cannot route packet 400 to node 100g, and thus, discards packet 400.

It will be understood by those skilled in the art that various changes and modifications may be made to the disclosed implementations, and equivalents may be substituted for elements thereof without departing from the true scope of the invention. In addition, many modifications may be made to adapt a particular element, technique or implementation to the teachings of the present invention without departing from the central scope of the invention. Therefore, it is intended that this invention not be limited to the particular implementations and methods disclosed herein, but that the invention include all implementations falling within the scope of the appended claims.

What is claimed is:

1. A method for communicating a packet in a communications network comprising a cell relay satellite, said method comprising the steps of:

dividing the packet into segments at a source in the communications network, wherein said dividing step includes the steps of:
prepending a header portion to the packet;
appending a trailer portion to the packet; and
inserting a null padding portion between the trailer and the header so that a combined length of the packet, the header portion, the trailer portion, and the null padding portion equals to an integer multiple of the length of the second portion of each of the generated cells;

generating a cell for each of the segments, wherein each cell includes a first portion and a second portion with a prefix, a downlink beam locator, and a source identifier included in the first portion;

inserting each of the segments into the second portion of each of the generated cells, respectively; and transmitting the generated cells to the cell relay satellite.

* * * * *